(12) United States Patent
Ashley

(10) Patent No.: US 8,865,080 B2
(45) Date of Patent: Oct. 21, 2014

(54) DEVICES, PROCESSES AND METHODS FOR THE PRODUCTION OF LOWER ALKYL ESTERS

(75) Inventor: Tom Michael Ashley, Prosser, WA (US)

(73) Assignee: Renewable Energy Group, Inc., Ames, IA (US)

( * ) Notice: Subject to any disclaimer, the term of this patent is extended or adjusted under 35 U.S.C. 154(b) by 1501 days.

(21) Appl. No.: 12/345,470

(22) Filed: Dec. 29, 2008

(65) Prior Publication Data

US 2009/0300973 A1    Dec. 10, 2009

Related U.S. Application Data

(60) Provisional application No. 61/060,053, filed on Jun. 9, 2008.

(51) Int. Cl.
| | |
|---|---|
| B01J 19/00 | (2006.01) |
| C10L 1/18 | (2006.01) |
| B01J 19/24 | (2006.01) |
| C10L 1/02 | (2006.01) |
| C10L 1/19 | (2006.01) |

(52) U.S. Cl.
CPC .......... *B01J 19/2415* (2013.01); *B01J 19/2405* (2013.01); *C10L 1/026* (2013.01); *C10L 1/19* (2013.01); *B01J 2219/00006* (2013.01); *B01J 2219/0004* (2013.01); *B01J 2219/00168* (2013.01); *B01J 2219/00186* (2013.01); *Y02E 50/13* (2013.01)
USPC ............. 422/129; 422/225; 554/124; 44/308

(58) Field of Classification Search
CPC ................. B10J 19/214; B10J 19/2405; B10J 2219/00006; B10J 2219/0004; B10J 2219/00168; B10J 2219/00186; B10J 2219/00835; B10J 2219/00783; B10J 2219/0086; B10J 2219/00873; B10J 2219/00891; B10J 2219/00822; B10J 2219/00889; B10J 2219/00995; B10J 2219/00831; B10J 2219/00833; B10J 2219/00918; B10J 2219/00117; B10J 2219/00826; B10J 2219/00828; B10J 2219/00907; B10J 2219/00786; B10J 2219/00855; B10J 2219/00869; B10J 2219/00997; B10J 2219/2453; B10J 2219/2465; B10J 2219/2474; B10J 2219/2475; B10J 2219/2479; B10J 2219/2482; B10J 2219/2497; B10J 2219/00015; B10J 2219/00024; B10J 2219/00033; B10J 2219/00094; B10J 2219/00198; B10J 2219/00806; B10J 2219/00808; B10J 2219/0081; B10J 2219/00844; B10J 2219/00867; B10J 2219/00898; B10J 2219/00905; B10J 2219/00961; B10J 2219/182; B10J 2219/1943; B10J 2208/0061; B10J 2208/00203; B10J 2208/0053; B10J 2005/0636; B10J 5/0646; B10J 5/0475; B10J 5/0647; B10J 5/0655; B10J 13/0072; B10J 35/0006; B10J 35/04; B10J 12/007; F15D 1/001; F15D 1/04; C10L 1/026; C10L 1/19; Y02E 50/13; Y02E 60/324; Y02E 60/50
USPC ............................... 44/308; 554/169; 422/189
See application file for complete search history.

(56) References Cited

U.S. PATENT DOCUMENTS

| | | | | |
|---|---|---|---|---|
| 5,514,820 | A * | 5/1996 | Assmann et al. | 554/167 |
| 6,174,501 | B1 | 1/2001 | Noureddini | |
| 2003/0032826 | A1 | 2/2003 | Hanna | |
| 2005/0080280 | A1 * | 4/2005 | Yoo | 554/174 |
| 2007/0260079 | A1 * | 11/2007 | Fleisher | 554/174 |

FOREIGN PATENT DOCUMENTS

| | | | |
|---|---|---|---|
| AU | 2007278216 B2 | | 1/2008 |
| AU | 2007311600 B2 | | 4/2008 |
| WO | WO2008/003154 | * | 1/2008 |
| WO | WO2008003154 | | 1/2008 |

OTHER PUBLICATIONS

"Oil production engineering in polymer flooding", Bozhong Hu, Petroleum Industry Press, Feb. 2004, pp. 188-194.
"Static Mixer—Foundation and Application", Decheng Wang and Baodong Ma, Textile Industry Press, Apr. 1985, pp. 198-199.

* cited by examiner

*Primary Examiner* — James Goloboy
*Assistant Examiner* — Latosha Hines
(74) *Attorney, Agent, or Firm* — Ryan N. Carter; Glenn Johnson

(57) ABSTRACT

Embodiments of a process for production of biodiesel from a transesterification reaction of alcohol and triglycerides in a multi-zone tubular reactor is disclosed. Alkyl esters and glycerin are formed from reactants in a reaction mixture as the reaction mixture flows through the zones. The zones include an entrance zone, an exit zone, and an intermediate zone between the entrance and exit zones. The zones are characterized by physical properties such as viscosity, density, composition, and flow regime. The entrance and intermediate zones include static mixers that perform structured mixing that increases the conversion and yield. The degree of mixing provided by the mixers is different in the zones to account for differences in physical properties. Additionally, the product stream from the reactor is passed through a coalescer to increase droplet size of a dispersed glycerin phase, facilitating both rapid separation of the glycerin phase from the biodiesel phase, and increased conversion and yield in a decanter.

32 Claims, 2 Drawing Sheets

DEVICES, PROCESSES AND METHODS FOR THE PRODUCTION OF LOWER ALKYL ESTERS

CROSS REFERENCE TO RELATED APPLICATION

This application claims the benefit of and incorporates by reference U.S. patent application No. 61/060,053 which was filed on Jun. 9, 2008.

BACKGROUND OF THE INVENTION

The present invention relates generally to methods for producing fatty acid esters by the reaction of an ester and another organic compound with the exchange of alkoxy or acyl groups. More particularly, the present invention relates to methods for the transesterification of triglycerides such as vegetable oils or animal fats to produce fatty acid esters that may be used in the economical production of biodiesel.

Biodiesel is the common name for mono alkyl esters of long chain fatty acids derived from vegetable oils or animal fats. Biodiesel is a promising alternative fuel source suitable as a diesel fuel or diesel fuel lubricity additive because it is biodegradable, non-toxic, and has low emission profiles as compared to conventional fuels. However, high raw material and processing costs have limited the widespread use of biodiesel.

The most common method of producing biodiesel is the base-catalyzed transesterification (or alcoholysis) of triglycerides such as vegetable oils and animal fats. The transesterification reaction involves reacting the triglyceride with an alcohol to form fatty acid esters and glycerol. The reaction is sequential wherein the triglycerides are converted to diglycerides, monoglycerides and then to glycerol with a mole of ester liberated at each step. Transesterification of oils and fats also has been described in connection with the production of detergents, cosmetics, and lubricating agents.

Historically, triglycerides in fats and oils have been methylated or otherwise esterified in a two-step process using an acidic catalyst, such as is described in the U.S. Pat. No. 4,695,411 to Stern et al., U.S. Pat. No. 4,698,186 to Jeromin et al., and U.S. Pat. No. 4,164,506 to Kawahara et al. Transesterification processes employing alkaline catalysts, such as U.S. Pat. No. 5,525,126 to Basu et al., U.S. Pat. No. 5,908,946 to Stern et al., and U.S. Pat. No. 6,538,146 to Turck, have been known in the art, as well.

Application of prior art has, with some frequency, resulted in the production of lower alkyl ester products that do not meet applicable national or international quality specifications for B100 biodiesel (a pure biodiesel product not blended with petroleum diesel). Frequently, these quality problems, such as gelling, can be attributed to an insufficient degree of conversion of process feedstocks, insufficient yield of alkyl ester products, and incomplete separation of reaction products. The invention subsequently described results in improved degrees of conversion and yield, and efficiencies in product separation, including such that the resulting B100 product meets or exceeds applicable specifications, most notably ASTM D6751 and the more rigorous EN 14214.

SUMMARY OF THE INVENTION

Certain embodiments of the present invention relate to devices, processes and methods for the production of lower alkyl esters. Embodiments of the present invention relate to devices, processes and methods for improved conversion of process feedstocks and yield of alkyl ester products. Embodiments of the present invention relate to devices, processes and methods for improved performance and efficiency in reactor and decanter systems. Embodiments of the present invention relate to devices, processes and methods for accomplishing improved coalescing and decanting of biodiesel reaction products.

DETAILED DESCRIPTION OF THE INVENTION

Figure 1:
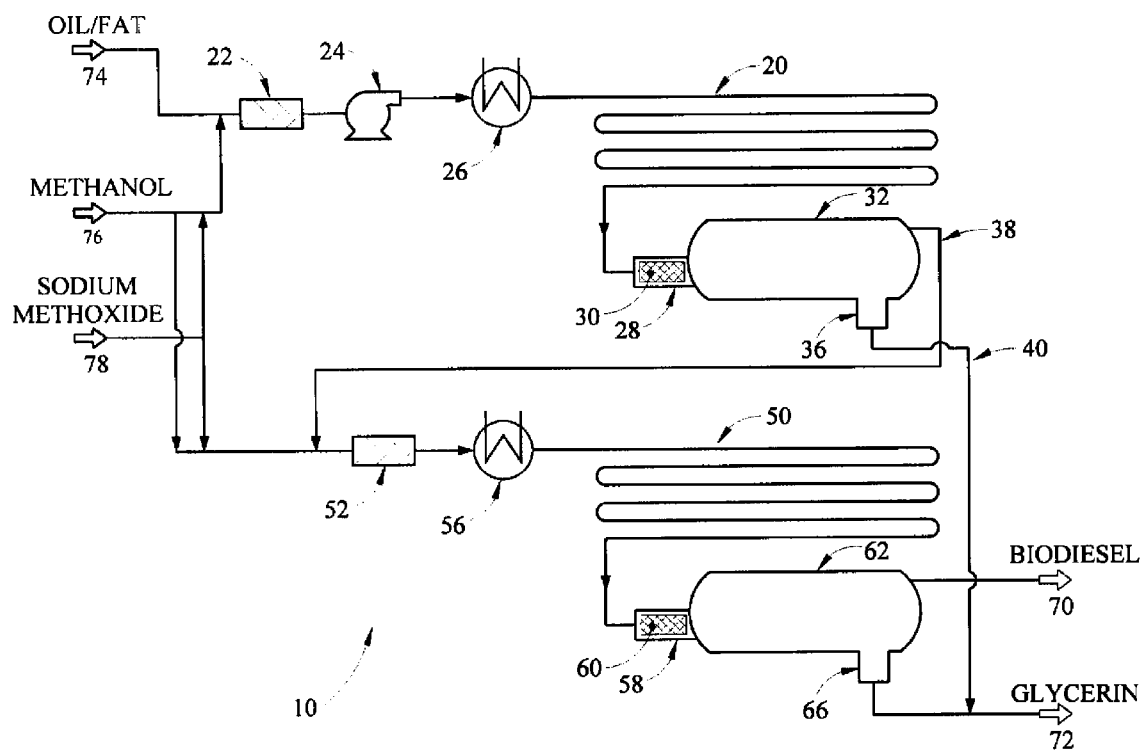
FIG. 1 is a schematic flow diagram illustrating inventive devices, processes and methods for the production of biodiesel and/or other lower alkyl esters.

In some embodiments of the present invention a series of two or more tubular reactors are utilized in the production of biodiesel and/or other lower alkyl ester products. In some embodiments, the biodiesel and/or other lower alkyl ester products are generated by a transesterification reaction. In some embodiments one or more of the tubular reactors is/are followed, in terms of process stream, by a decanter. In some embodiments one or more of the decanters is preceded, in terms of process stream, by a coalescing device positioned between the decanter and the preceding tubular reactor.

In some embodiments, the process comprises the reaction of fatty acid triglycerides with one or more lower alcohols in the presence of a homogenous or heterogeneous alkaline catalyst. In some embodiments, the fatty acid triglycerides may comprise soybean oil, canola oil, and other refined vegetable oils, or appropriately pretreated alternative triglyceride sources such as beef tallow, yellow grease, or waste cooking oils. In some embodiments, the lower alcohols may comprise methanol, ethanol, or butanol. In some embodiments, the alkaline catalyst may comprise the sodium or potassium alkoxide of the corresponding alcohol (e.g., sodium methoxide, potassium ethoxide). The basic forward moving reaction is typically designated the transesterification of the oil or fat.

Transesterification is generally an equilibrium reaction, where an ester is converted into a different ester by exchange of the acid groups or by exchange of the alcohol groups. An example of a transesterification reaction is shown below:

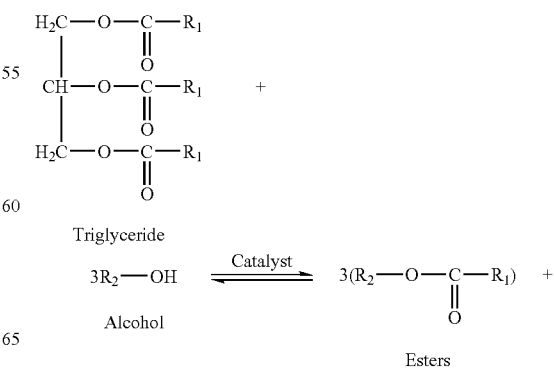

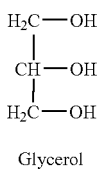

Glycerol

As shown in the above scheme, a triglyceride is reacting with the alcohol and converted stepwise to a diglyceride, a monoglyceride and finally to glycerol (also known as glycerin) with a fatty acid alkyl ester liberated at each step, resulting in 3 ester molecules. In addition to the fatty acid alkyl esters resulting in the reaction, glycerin is formed as a by-product. The equilibrium of the reaction can be shifted towards the formation of the required fatty acid alkyl esters by increasing the amount of the alcohol reactant and/or by removing the glycerin by-product.

As used herein, the term triglyceride has its ordinary meaning in the art as a glycerol having all of its hydroxyl groups substituted by fatty acids. Examples of suitable triglyceride feedstock for use in the present invention include fats and oils of synthetic or natural origin, or mixtures thereof, comprising $C_4$-$C_{24}$, and in particular $C_{12}$-$C_{18}$ fatty acid groups, which may be straight or branched, saturated or unsaturated. Percent conversion of triglyceride is calculated on the basis of fatty acid present in the triglyceride that is consumed in the reaction to produce reaction intermediates, desired reaction products (i.e., alkyl esters) and undesired reaction products. In particular, the percent conversion of triglyceride in the transesterification reaction is 100 percent multiplied by the ratio of the amount of triglyceride consumed in the reaction to its initial amount. Percent yield is calculated on the basis of fatty acid present in the triglyceride that is converted to the desired alkyl ester product. In general, the percent yield of a desired product of a reaction with respect to a selected reactant is:

100 percent×[ no. of moles of the desired product formed/(initial no. of moles of the selected reactant×stoichiometric ratio of the product to the reactant)].

Therefore, the percent yield of alkyl ester product with respect to the triglyceride is:

100 percent×[ no. of moles of the alkyl ester formed/ initial no. of moles of the triglyceride×3].

wherein "3" is the stoichiometric ratio of the alkyl ester to triglyceride in the transesterification reaction. This definition of yield is equivalent to 100 percent multiplied by the ratio of the actual mass of desired product in a reaction and the predicted mass of the desired product. The predicted mass is determined from the initial mass of reactant used in the reaction and the stoichiometric ratio of the product to reactant. The predicted mass is given by:

(mass of reactant/MW reactant)×stoichiometric ratio of product to reactant×MW product where "MW" refers to molecular weight.

In general, alcohols suitable for use in the present invention typically comprise any primary and secondary monohydric aliphatic alcohols having one to eight carbon atoms. Preferred alcohols for use in the transesterification process of the present invention are methanol, ethanol, propanol, isopropanol, and butanol, with methanol and ethanol being more preferred. A particularly preferred alcohol, for example, is methanol because it is of low cost, it reacts quickly, and catalysts such as NaOH readily dissolve in it. As used herein, the term "alkanol" refers to monohydric alcohols as opposed to glycols or glycerols.

In general, suitable catalysts for the transesterification reaction include, but are not limited to alkalis. Alkali metal catalysts suitable for the transesterification reaction of the present invention include soluble NaOH, LiOH, KOH, carbonates and corresponding sodium and potassium alkoxides such as sodium methoxide, potassium ethoxide, sodium propoxide, potassium butoxide, and the like.

In some embodiments of the present invention described herein the process is optimized to the production of methyl esters using refined vegetable oils. While the concepts presented in this disclosure are applicable to the production of ethyl, butyl, and even higher alcohol esters, the properties of these alcohols and the resulting alkyl esters (e.g., density, viscosity, miscibility, etc.), and the kinetics of the transesterification reaction, can vary substantially. For example, the kinetics associated with the use of alcohols other than methanol would be different than with methanol. Some such embodiments (using alcohols other than methanol) may necessitate longer reaction times in the reactors than some of the embodiments described herein (using methanol). It is understood that if the production of, for example, ethyl esters is desired, then the corresponding catalyst would be an ethoxide (either sodium or potassium). In certain embodiments it is preferable that the catalyst should "match" the alcohol if a high purity product is desired.

An embodiment of the present invention is illustrated in FIG. 1. FIG. 1 is a schematic flow diagram illustrating inventive devices, processes, and methods for the production of biodiesel and/or other lower alkyl esters. A general flow diagram of the equipment is shown at 10. Feedstocks for the process may comprise refined vegetable oil 74, in some embodiments soybean oil, methanol 76, and sodium methoxide 78. (In some embodiments, potassium methoxide may be used instead of sodium methoxide.) Also shown are two tubular reactors 20 and 50. Following tubular reactors 20 and 50, generally, are decanters 32 and 62. Reaction products of the process 10 are shown to be biodiesel 70 and crude glycerin 72.

As shown in FIG. 1, sodium methoxide and methanol are mixed prior to being introduced into the oil stream 74 upstream of static mixer 22. The mixture of oil, methanol, and sodium methoxide leaving static mixer 22 enters high shear mixer 24 and passes through heat exchanger 26 before entering the horizontal tubular reactor 20. Following tubular reactor 20 is coalescer or coalescing unit 28 which includes coalescing element 30 which is positioned at the entrance to decanter 32. Decanter 32 is designed such that the interfacial area between the biodiesel and glycerin phases is minimized to minimize the potential for reverse reactions which may compromise conversion and yield. Decanter 32 includes a sump 36. Crude glycerin 40 is drawn from sump 36. The biodiesel phase including some unreacted oil and methanol, and sodium methoxide catalyst exits decanter 32 at 38 and is mixed with additional methanol and sodium methoxide prior to entering into static mixer 52 and passing through heat exchanger 56. After passing through heat exchanger 56 the reaction mixture enters a second horizontal tubular reactor 50. After exiting tubular reactor 50 the reaction mixture enters coalescing unit 58 which includes coalescing element 60 prior to entering the second decanter 62. A second decanter 62 is designed such that the interfacial area between the biodiesel and glycerin phases is minimized to minimize the potential for reverse reactions which may compromise conversion and yield and also includes sump 66 for glycerin extraction from the decanter. The extracted glycerin phase can be joined with the extracted glycerin phase of the first decanter 32 and exit the process at 72. The final biodiesel reaction product is removed from decanter 62 at 70. The final biodiesel reaction product can be further washed and/or refined.

Multi-Zone Tubular Reactors

It is known that, as the transesterification reaction proceeds, feedstock and other reactants are converted to the desired alkyl ester and glycerin products. Accordingly, the amount, and chemical and physical characteristics of these reactants, products, and reaction intermediates such as diglycerides and monoglycerides vary over the course of the reaction. Specifically, in the initial stage of the reaction, fatty acid triglycerides have a relatively high viscosity, while the alcohol has a relatively low viscosity. Furthermore these two phases are immiscible. Due to the high molar concentration of alcohol in the initial reaction mixture, the superficial viscosity of the reaction mixture, in bulk, is relatively low. As the reaction proceeds from the initial mass-transfer controlled region to the kinetics controlled region, the reaction mixture becomes a pseudo-homogenous "single" phase composed of reactants (fatty acid triglycerides and methanol), reaction intermediates such as diglycerides and monoglycerides, and reaction products alkyl esters and glycerin. It is noted that such conversion results in a change in the superficial viscosity of the reaction mixture, i.e., the viscosity of the reaction mixture increases. In the final stages of the reaction, the reaction is completed (or nearly completed), ideally, to the limits imposed by equilibrium. The reaction mixture at this stage is composed primarily of the desired alkyl ester and glycerin products, and residual excess alcohol if applicable. Again, the viscosities of the two primary products are different than those of the reactants and reaction intermediates. Most notably, the viscosity of the glycerin product is relatively high, and results in a superficial viscosity of the bulk reaction mixture at this stage that is higher than in preceding sections of the reactor. Furthermore, the reaction products, alkyl esters and glycerin constitute immiscible phases.

In some embodiments, he present invention provides for the maximum attainable conversion of process feedstock, and yield of biodiesel product, by explicitly taking the changing characteristics of the reaction mixture, most notably viscosity and interfacial tension (a measure of miscibility), into consideration in the reactor design process. The maximum attainable conversion and yield are achieved by optimizing reactor pipe diameters, the number, type and spacing of static mixing elements, etc. within a reactor comprised of at least three distinct zones as subsequently described.

In some embodiments of the present invention the tubular reactors may be configured by adjustment of the pipe diameters (and hence flow velocities and Reynolds Numbers), pressures, temperatures, and static mixer type, configuration and spacing, or lack thereof, such that novel conditions occur along the length of the tubular reactors. In some embodiments the first tubular reactor may comprise at least three general reactor sections. Each section may have the same pipe diameter. In some embodiments, the three sections correspond generally to zones of three different conditions of reaction mixture viscosity, and phase miscibility which are extant in the respective three sections. In some embodiments, the reaction mixture viscosity is relatively low in the first section and transitions to a higher viscosity in the second section and transitions to an even higher viscosity in the third section.

As the reaction mixtures flows through the reactor the transesterification proceeds resulting in a continuous change in composition, and thus, a change in properties of the reaction mixture. Properties include, but are not limited to, chemical composition, number of phases, viscosity, composition of phases, miscibility of phases, and density. In the first stage or section of the reactor, the feedstock and methanol catalyst phases are immiscible. As the reaction proceeds, a pseudo-homogenous liquid phase is predominant in the second section of the reactor. As the reaction nears completion, two relatively immiscible phases, alkyl ester and crude glycerin, are formed and are predominant in the third section of the reactor.

The flow in the tubular reactor can be characterized by the Reynolds Number:

$$Re = \rho v \, d/\mu$$

in which $\rho$ is the density of the reaction mixture, $v$ is the average tube velocity, $d$ is the internal tube diameter, and $\mu$ is the viscosity of the mixture, being used as the characteristic value in this regard. The Reynolds Number of the flow varies as the reaction mixture flows through the reactor due at least to changes in the reaction mixture properties, density and viscosity. The Reynolds Number can also be made to vary along the reactor length through variation in the diameter of the reactor.

As described in more detail below, the flow at any point along the reactor can be characterized as laminar, transitional, or turbulent. Transitional flow, generally, refers to a flow that is a mixture of laminar and turbulent flow, with turbulence near the center of the pipe, and laminar flow near the edges. Laminar flow exists for Reynolds Numbers of less than about 2300 and fully developed turbulence beyond a Reynolds Number of about 4000. Turbulence starts to develop in a range beyond a Reynolds Number of 2300. Thus, transitional flow exists in a range of Reynolds Numbers between about 2300 and 4000.

In the calculation of the Reynolds Number, density is calculated in accordance with the known relation at the reaction temperature. The relation is used for the average density of a pseudo-homogenous "monophase" mixture:

$$1/\rho = \Sigma_i w_i / \rho_i$$

where $\rho_i$ is the density of component i and $w_i$ is the mass fraction of that component. Alternatively, density may be empirically determined with a densimeter. A corresponding relation applies in the case of viscosity. In addition to the experimental determination of $\mu$ using a viscosimeter, the pseudo-homogenous mixture viscosity may be calculated in accordance with the following equation:

$$\ln \mu = \Sigma_i x_i \ln \mu_i$$

where $\mu_i$ is the viscosity of component i and $x_i$ is the mole fraction of component i.

The composition of feed to the first reactor includes triglycerides, alcohol, and catalyst. The feed is a two phase mixture with a continuous phase including primarily triglycerides and a dispersed phase including primarily alcohol and some catalyst. As the reaction mixture flows along the first section of the reactor, the triglycerides and alcohol react to form alkyl ester and glycerin. The reaction mixture in the first section generally is characterized by a two phase liquid with a continuous phase including mostly triglycerides and some reaction intermediates and alkyl ester and a dispersed phase including mostly alcohol, catalyst and some product glycerin.

When the concentration of reaction intermediates (i.e., mono- and diglycerides) and alkyl ester in the reaction mixture is sufficient to produce a co-solvent effect, the reaction mixture becomes a pseudo-homogenous "monophase" mixture. This transition identifies the boundary between the first and second sections of the reactor.

The pseudo-homogenous liquid phase may be considered to be comprised of a single continuous phase and two dispersed phases. The phases in the second section are generally more miscible than the phases of the first section. The dispersed phases in the second section include an alcohol phase and a glycerin phase. The continuous phase includes triglycerides, diglycerides, monoglycerides, product alkyl ester, and some methanol. As indicated above, the viscosity of the reaction mixture in the first section is generally lower than that of the second section, due to the molar concentration of alcohol in the initial reaction mixture.

As the reaction mixture flows along the second section, the alcohol phase is depleted due the transesterification reaction, resulting in the eventual disappearance of a distinct alcohol phase at some point along the reactor. The remaining alcohol is partitioned between the glycerin phase and the continuous phase. The transition of the reaction mixture from a pseudo-homogenous "monophase" mixture composed of one continuous and two dispersed phases to a two phase mixture with a higher viscosity and higher degree of immiscibility represents a transition from the second section to the third or exit section of the reaction. In the third section, the glycerin phase includes mostly glycerin and some alcohol and catalyst and the continuous phase includes mostly alkyl ester with some reaction intermediates, alcohol, and catalyst.

In some embodiments, the combination of parameters of pipe diameter, flow velocity, operating temperature and pressure are configured to optimize mixing intensity over the course of the reaction, specifically over the range of reaction mix composition, viscosity and miscibility which occurs during the reaction.

In some embodiments, static mixers are incorporated into one or more reactor sections which are designed to accommodate the unique characteristics of the reaction mixture within each section. The types of static mixers utilized may include, but are not limited to, pitched blade, structured packing, or random packing, or combinations thereof.

In various embodiments of the invention, the reaction mixture in the first and second sections is statically mixed to increase the conversion of reactants to products via the transesterification reaction. Such mixing or emulsification, generally, improves the homogeneity of the reaction mixture and provides increased interfacial area between the phases, which increases conversion and yield. For instance, the mixing increases the contact of the reactants (i.e., the alcohol and triglycerides) in the first section of the reactor which then increases conversion via the transesterification reaction.

As discussed above, the reactants (alcohol and tryglycerides) reside primarily in separate phases in the reaction mixture in the first and second sections. Thus, the reaction occurs due to mass transfer of reactants between phases. Accordingly, the initial stage of the transesterification reaction is commonly known as the mass transfer controlled region. Such mass transfer is enhanced by increasing the surface area of contact of the dispersed phase with the continuous phase. In the various embodiments of the invention, the reaction mixture is mixed to maintain a selected droplet size distribution of the dispersed phase or phases in a particular section or sections, or portions thereof. In such embodiments, a maximum, mean, or average droplet size can be maintained that is less than a selected value. In further embodiments, a droplet size distribution with a desired breadth can also be maintained. For example, a standard deviation less than desired value can be maintained. In certain embodiments, the reaction mixture is mixed in the first and second sections to maintain a selected droplet size distribution in both of the sections. In some exemplary embodiments, the droplet size can be less than 100 microns, less than 50 microns, or more narrowly, less than 20 microns.

It is expected that such mixing enhances mass transfer of alcohol and catalyst into the continuous triglyceride phase to facilitate equilibrium conversion to alkyl esters and glycerin. Additionally, in the second section of the reactor, it is expected that a reduced droplet size of the glycerin phase enhances the mass transfer of the glycerin out of the continuous phase to the glycerin phase, also shifting the equilibrium conversion to alkyl esters and glycerin.

In certain embodiments of the present invention, the reaction mixture is mixed due to a turbulent random flow profile that exists in either transitional or fully developed turbulence regimes. The reaction mixture can alternatively or additionally be mixed by a static mixer, as mentioned above, disposed in the reactor that interrupts the random flow profile and superimposes a flow structure different from the uninterrupted flow. The uninterrupted flow can be laminar, transitional, or fully developed turbulence.

In some embodiments, the degree of mixing provided to each section can be adjusted to adapt to differences in physical properties in the sections. In particular, the degree of mixing applied to the first and second sections may differ to maintain a selected droplet size distribution in each of the sections due to differences in physical properties.

In some embodiments, the degree of structured mixing provided by static mixers is adjusted and is different in the first and second sections to adapt to the differences in physical properties between the sections. The degree of structured mixing may differ between sections due to differences in, for example, miscibility and viscosity. In such embodiments, the degree of structured mixing provided to the first and second sections is adjusted to maintain a maximum or mean droplet size of a dispersed phase or phases in both of the sections. In such embodiments, one section may have maximum or mean droplet sizes less than the other. In an exemplary embodiment, the first section may have a maximum or mean size less than 20 microns and the second section may have a maximum or mean droplet size less than 50 microns.

A static mixer, generally, is a device for blending (mixing) liquid materials, in particular, liquids that are immiscible or having varying degrees of miscibility. Various types of static mixers or structures for performing static mixing are known in the art and can include, but are not limited to, incorporation of mixer elements such as a baffles, packing material, fluidizing packing material, or combinations thereof inside the reactor. Examples of packing material include Pall rings, Raschig rings, Berl saddles, inert spheres, and the like.

Exemplary static mixers including mixer elements may comprise a series of blades or baffles that can be made from metal or a variety of plastics. Typical materials of construction for the static mixer components include stainless steel, polypropylene, Teflon, Kynar and polyacetal. Static mixers having a variety of structures or arrangements of mixer elements are possible and commercially available. Exemplary embodiments include, but are not limited to, a spiral or helical mixer element that extends along a length of a tubular reactor, sets of baffles (e.g., semielliptical, semicircular) spaced out along a length of a tubular reactor, and sets of blades (intersecting, non-intersecting) spaced out along a length of a tubular reactor. Static mixers can be obtained from, for example, Koflo Corporation of Cary, Ill. and Chemineer, Inc. of Dayton, Ohio.

In general, a droplet size distribution of a reaction mixture subjected to static mixing is a function the physical properties of the reaction mixture (e.g., density, viscosity, and degree of miscibility), the flow velocity, flow regime (i.e., laminar, transitional, turbulent) and the characteristics or parameters of the static mixer. The characteristics or parameters of the static mixer depend on the type and structure of the static mixer. For example, a static mixer composed of intersecting blades can have parameters including the length of the blades and the pitch (i.e., the angle of attack of the blades with respect to the flow).

Various correlations are known and available that relate anticipated droplet size in a fluid flowing through a static mixer to physical properties of the fluid, its velocity, and the mixer parameters. Alternatively, the droplet size distribution may be determined empirically. In certain embodiments of the present invention, the static mixers in the first section, second section, or both sections of the reactor have parameters that provide a desired droplet size or droplet size distribution in all or a majority of the length of the sections. In these embodiments, at least one characteristic of the static mixers in the first and second section are different to account for differences in physical properties and flow properties of the reaction mixture in the sections.

In further embodiments, a section of the reactor can include at least two static mixers or sets of mixer elements at an axial position that are spaced apart along an axis of the reactor. Generally, the structure imposed on the flow by the static mixer or mixer elements decays with distance from the static mixer or elements. In the absence of another flow interruption, the structure in the flow decays to the point that at some critical distance (Lc) from the static mixer, the flow returns to its uninterrupted or unstructured state. It is expected that the droplet size distribution provided by the structured mixing of the static mixer will also tend to decay, though not necessary at the same rate, to the droplet size distribution of uninterrupted flow.

Spaced apart mixers or mixing elements may be particularly advantageous in reactor sections that are relatively long compared to other sections, such as the second section of the reactor. A long static mixer or mixers that extends through all or substantial portion of a section increases equipment costs and increases pressure drop. Also, due to the relatively low immiscibility or pseudo-homogeneous nature of the reaction mixture in the second section, the droplet size distribution imposed on the reaction mixture is maintained a significant distance from a static mixer.

In certain exemplary embodiments, the spacing of static mixers or mixer elements can be less than 0.5 Lc, 0.5 Lc to Lc, Lc to 1.5 Lc, 1.5 Lc to 2 Lc, 2 Lc to 3 Lc, or greater than 3 Lc. In other embodiments, the static mixers or sets or mixer elements can be spaced apart to maintain the desired droplet size distribution throughout the reactor section, which may correspond to one or more of the above-mentioned ranges.

In some embodiments, the first section of the reactor may incorporate at least one static mixer or sets of mixing elements. The degree of immiscibility is relatively high compared to the second section of the reactor. Thus, the degree of mixing provided to the reaction mixture in the first section may be higher than the second section. In some embodiments, the mixer parameters of a static mixer that provide the desired characteristics (maximum or mean droplet size) of a droplet distribution of the dispersed phase in the initial section of the reactor are the same or different than in the second section.

In some instances, the first section includes a single relatively long static mixer, which is designed based on the flow velocity, viscosity and phase immiscibility of the reaction mixture. The single static mixer may extend along an axial portion that is at least 5% or more of the length of the first section.

In other embodiments, the first section includes several static mixers or sets of mixing elements spaced apart along an axial portion of the reactor. The axial portion occupied by the mixers can be at least 10% or more of the length of the first section. In such embodiments, the static mixers may be separated by a distance smaller than the spacing of static mixers in a second section due to the lower viscosity and lower miscibility in the first section of the reactor. The spacing is small enough to maintain a desired droplet size distribution. For example, the distance can be less than Lc. As discussed above, the use of one or more static mixers within the initial section of the reactor superimposes structured flow components on the turbulent (random) flow profile of the reaction mixture. Such superimposition results in additional localized velocity and pressure variations within the flow, and hence more effective mixing, than that achievable in turbulent flow without the static mixers. In some embodiments, the reaction mixture leaving the initial section of the reactor comprises a pseudo-homogenous single phase mixture having a higher viscosity than the reactor feed. The static mixer in the first section is designed to produce droplets of dispersed phase (i.e., methanol) generally below 50 microns in diameter (and in some embodiments, generally below 20 microns in diameter) at the flow velocity and viscosity of the reaction mixture. The relatively high viscosity of the continuous phase (i.e., feedstock), and the immiscible nature of the phases generally necessitates the use of at least one relatively long static mixer to ensure the desired dispersed phase droplet size is achieved.

In some embodiments of the present invention, in the second section of the reactor, static mixers may also be incorporated which are tuned to the reaction mixture flow velocity, composition and viscosity in this section of the reactor to ensure that the droplet size distribution of the dispersed phases (methanol and glycerin with a high methanol content) in this section of the reactor is maintained in the desired range of generally below 50 microns (and in some embodiments, generally below 20 microns). The section can include several static mixers spaced apart along an axial portion of the reactor, the length of the axial portion extending between the position of the first static mixer to the last static mixer. The length of the axial portion can be at least 50%, 70%, 90%, or more than 90% of the length of the second section.

Again, the superimposition of structured mixing on the reaction mixture flow results in localized velocity and pressure variations, and thereby increases mixing intensity beyond that achievable in their absence. Such enhanced mixing intensity ensures that maximum conversion (i.e., equilibrium conversion) and yield are achieved within the second section of the reactor. In some embodiments, the reaction mixture leaving the second section of the reactor is a two phase mixture having a higher viscosity than the pseudo-homogenous reaction mixture which occurs within the second section of the reactor. The changing properties of the continuous and dispersed phases over the course of reaction within the second section of reactor, and the Reynolds Number of the pseudo-homogenous single phase which they constitute, result in static mixer designs which are generally shorter in length than those employed in the first section of the reactor.

In the final section of the reactor, the viscosity of the reaction mixture has increased or does increase above that in the intermediate section. In some of the embodiments of this invention static mixers are not used in this third section. The relatively low turbulence of the flow in this third section facilitates the separation of the phases extant in this third section.

As discussed above, the reaction mixture in the third section includes a continuous phase that is primarily alkyl ester product and a dispersed phase that is primarily glycerin. Alcohol is partitioned between the two phases. Separation of the glycerin phase from the reaction mixture helps drive the reaction to its highest achievable degree of conversion and yield.

In some embodiments of the invention, different pipe diameters, and static mixer design and spacing may be used in the three reactor sections to optimize mixing intensity or lack thereof, and reduce pumping costs and the capital cost of the reactors. As the reaction mixture flows from the second section to the third section there is an increase in viscosity. Therefore, it is expected that the Reynolds Number would decrease between the second and third section, even if the pipe diameter is unchanged. One embodiment of the present invention uses pipe diameters in the third section that result in further reduction of the Reynolds Number in the third section. The diameter of pipe in the third section can be designed so that the flow regime in the third section is in the transitional or laminar regimes. The reduction or elimination of turbulence of the resulting transitional or laminar flow regimes facilitates the separation of the glycerin and alkyl ester phases extant in this section of the reactor. In some embodiments, laminar flow is achieved in at least portions of the third section of the reactor.

In some embodiments, by designing the three sections of the reactor (e.g., pipe diameters, static mixer design and spacing) uniquely in view of the flow properties and phase miscibilities extant within each section, maximum conversion may be realized at minimum reactor capital and operating costs.

One example of an embodiment of the first reactor of the present invention involves a total of approximately 900 feet of 3-inch diameter pipe, specifically 30, 30 foot long pipe sections connected in series. The initial section of the reactor is 60 feet in length and incorporates a single, relatively long static mixer, the second section of the reactor is 750 feet long and incorporates 13 relatively short static mixers, the third section of the reactor is 90 feet long and incorporates no static mixers. For this embodiment, the nominal reaction temperature is 80° C.

In the above exemplary reactor system, the first section and the second section have static mixers that include pitched blade static mixers constructed of stainless steel from Koflo Corporation The static mixer in the first section has a total length of 38 inches; the static mixers in the second section are 20 inches in length.

In exemplary embodiments, the second section includes between 6 and 20 mixers. The lengths of the static mixers in the second section are between 12 and 24 inches. A distance between the mixers is between 30 and 130 feet, which is between 0.5 and 2 times a distance that the structured mixing deteriorates to zero.

In some embodiments, the static mixers in the second section can differ from one another. For example, the length of the mixers and mixer parameters of the mixers can vary from the upstream end to the downstream end of the second section to account for the change in the viscosity and miscibility. For example, the degree and amount of mixing provided by the mixers can decrease from the upstream end to the downstream end. In exemplary embodiments, the spacing between mixers, mixer type (e.g., pitched blade, random packing) the length of the mixers, the length of blades or their pitch can be changed in this reactor section as required to achieve the desired mixing intensity.

In other embodiments, the type, configuration, structure and spacing of mixing elements such as structured packing and/or random packing may be similarly optimized within each reactor section or subsection.

The mole ratio of alcohol to triglyceride employed in some embodiments of the present invention ranges from 4:1 to 9:1. Catalyst (i.e., sodium or potassium alkoxide) ratios range from 0.2 wt % to 1.0 wt %, based on the weight of triglyceride feedstock.

In some embodiments, a high shear mixer is used prior to one or both reactors. The high shear mixer produces droplets of dispersed phase which are less than, or generally less than, 10 microns in diameter, and thereby minimizes the duration of the mass transfer controlled region of the transesterification reaction.

In other embodiments, the combination of parameters of pipe diameter, flow velocities, operating temperature, pressure and viscosity is configured such that a relatively "transitional" flow of reaction mixture occurs in the first section of the tubular flow reactor. In this first section, the Reynolds Number may be approximately 4000 or less.

It may be desirable for the flow in the second section following the transitional or laminar flow in the first section to be close to, at, or above fully developed turbulence. Thus, in this embodiment, the reactor pipe diameter can be decreased to increase the Reynolds Number in the second section of the reactor. In some embodiments the Reynolds Number of the flow in the second section is within the turbulent region (i.e., in excess of 4000). In this section of the tubular reactor, the reaction mixture is relatively constantly mixed by the turbulent flow nature of the reaction mixture. In some embodiments the reaction mixture is also subjected to a structured mixing imparted by additional static mixers positioned inside the second section of the tubular reactor. The static mixers increase the probability that the reaction mixture is highly homogenized in the second section. The mixing effectiveness in the second section enhances the maximum conversion (i.e., equilibrium conversion) and yield within the reactor.

In the final section of the reactor, the viscosity of the reaction mixture has increased or does increase and consequently drops the Reynolds number. The flow may be turbulent, transitional, or laminar. In some embodiments, the reactor pipe diameter is increased to further decrease the Reynolds Number in the third section of the reactor to a transitional or laminar flow regime. In some embodiments of the present invention, mixers are not used in this third section. The relatively low turbulence or laminar nature of the flow in this third section facilitates the separation of the phases of the reaction mixture which are extant in this third section. In some embodiments the flow in this third section of the tubular reactor can approach laminar flow with an amount of settling of glycerin phase from the flow. One of the phases is primarily the reaction product glycerin. Separation of this product from the mixture helps drive the reaction to its highest achievable degree of conversion and yield.

In some embodiments, by designing the tubular reactor such that the Reynolds Number at the inlet and outlet of the tubular reactor are in the transitional and/or laminar regions, a relatively large pipe diameter may be used, and a shorter length of reactor is required to produce the necessary retention time for an acceptable level of reaction completion. Both the larger diameter and shorter length of reactor may decrease capital and operating (including pumping and heating) costs of the reactor. In some embodiments the use of static mixers in the first and second sections of the reactor generally ensures that equilibrium conversion is attained, despite the relatively low Reynolds Numbers and compact reactor dimensions of the embodiment. The lack of static mixers and the relatively low Reynolds Number in some embodiments of the final section of the reactor facilitates the separation of the glycerin phase from the biodiesel phase and thereby facilitates additional (beyond equilibrium) conversion and yield in this section of the reactor. The relatively low Reynolds number in this third section of reactor and the consequent facilitated separation of phases further facilitates more efficient coalescing and decanting operations in the succeeding steps of certain embodiments of the present invention.

In some embodiments the reaction mixture from the first reactor will be separated, by drawing off glycerin, to enhance the reaction equilibrium in the second reactor.

In some embodiments, a second tubular reactor 50 may be configured to follow the first decanter 32. Additional methanol and sodium methoxide may be added to the reactant mixture entering the second tubular reactor 50 as shown in FIG. 1.

In some embodiments the second tubular reactor 50 may have the same or different diameter, tubular length, and configuration of static mixers as may be utilized in the first tubular reactor 20. Drawing off a significant amount of glycerin in the first decanter 32 favors the reaction equilibrium in tubular reactor 50 to provide a higher concentration of biodiesel at the output of second tubular reactor 50 than would be possible, given the amount of methanol and catalyst used, without prior removal of the portion of the glycerin component. In some embodiments the second tubular reactor 50 may also comprise three sections similar to the three sections of the first tubular reactor 20.

In some embodiments a third tubular reactor followed by a third coalescer and decanter may follow the second decanter 62. In some such embodiments additional methanol and/or catalyst may be added to the reaction products prior to introduction into the third tubular reactor.

Coalescer/Decanter

Traditional biodiesel decanters have typically employed Stokes settling only. Some embodiments of the present invention precede a decanting operation such as at 32 with a coalescing unit 28 further comprising a coalescing element 30. The first decanter 32 may principally employ Stokes settling processes and may be designed to minimize the interfacial area between phases in the decanter, until the glycerin phase reaches sump 36. While the primary function of the coalescer and decanter units is phase separation, the transesterification reaction will still occur in the coalescing and decanter units, albeit at a slower rate than typically occurs in the tubular reactor. As discussed above, reaction mixture from the reactor includes a glycerin phase dispersed in a continuous "biodiesel" phase. The alcohol is no longer in a separate phase, but is partitioned between the biodiesel and glycerin phases. In some embodiments, decanters are designed to remove a minimum of 99.7% of the glycerin phase from the biodiesel or alkyl ester phase.

In general, liquid-liquid coalescers are used to accelerate the merging of many droplets to form a lesser number of droplets, but with a greater diameter. This increases the buoyant forces in the Stokes Law equation. Settling of the larger droplets downstream of the coalescing unit (e.g., in a decanter unit) then requires considerably less residence time. Coalescers exhibit a three-step method of operation: (1) droplet capture, (2) combine, aggregate, or coalesce captured droplets, and (3) Stokes settling with coalesced droplets.

In the first step, entrained droplets are collected primarily either by Intra-Media Stokes Settling or Direct Interception. Elements that depend on Intra-Media Stokes Settling confine the distance a droplet can rise or fall between parallel plates or crimps of packing sheets. In Direct Interception, a multiplicity of fine wires or filaments and wires (e.g., meshes, co-knits of wire and yarns and wire and glass wools) collect fine droplets as they travel in the laminar flow streamlines around them. A general rule with Direct Interception is that the size of the target (i.e., wires or filaments) should be close to the average sized droplet in the dispersion. In step two, droplet coalescence, once several droplets are collected on a plate, wire, or fiber, they will tend to combine in order to minimize their interfacial energy. The coalescence depends on factors including the adhesion of the droplets to the coalescing media, the void fraction of the media, and the interfacial tension between the droplets and the coalescing media.

In some embodiments the coalescing unit 28 serves to significantly accelerate the separation of the glycerin phase from the biodiesel phase. Since the glycerin phase is a reaction product, by removing it quickly, the reaction equilibrium is "tipped" towards the formation of additional biodiesel product. The quick removal of the glycerin phase significantly reduces scavenging of methanol into the glycerin phase and results in higher conversion and yield. In some embodiments this additional reaction is facilitated by providing excess methanol in the reaction mix. While some degree of the methanol is ultimately partitioned into the glycerin phase, the rate of such partitioning is effectively reduced by the accelerated removal of glycerin in the coalescing section of the decanter. As a result, the fraction of methanol in a separated glycerin phase drawn off the decanter is less than a process employing the decanter for phase separation without the coalescing unit. In some embodiments, the Stokes section of the decanter is configured to provide at least one hour of retention time, to ensure sufficiently complete reaction as well as effective phase separation, and to minimize interfacial area of the phases so that reversion of the reaction does not occur.

In various embodiments, the coalescer is designed to capture at least 70%, or more narrowly, at least 80% of dispersed phase greater than 5 microns in diameter and at least 80%, or more narrowly, at least 95% of all droplets greater than 35 microns. In some embodiments, the coalescer is designed such that the average droplet size exiting the coalescer is at least 100 microns, 300 microns, or more narrowly, at least 500 microns.

In an exemplary embodiment, the coalescer is designed to capture 85% of all droplets of dispersed phase greater than 10 microns in diameter and over 99% of all droplets of dispersed phase greater than 35 microns in diameter. In this exemplary embodiment, the coalescing medium is constructed principally of Teflon fibers and stainless steel wires. The average droplet size exiting the coalescer is approximately 500 microns. The diameter of the coalescer is sized such that bulk flow through the coalescer is sub-turbulent. In some of the embodiments of the present invention, the length of the coalescer is less than 3 feet. The settling velocity of a 500 micron droplet is approximately 200 times greater than the settling velocity of a 35 micron droplet at the conditions extant in the present invention, with a corresponding beneficial impact on decreasing the length of the Stokes section required to effect the separation. In one embodiment of the present invention, the use of a coalescer results in 99% removal of the dispersed phase from the continuous phase in the Stokes section in less than 1 minute, whereas the same separation for 35 micron droplets would take more than 90 minutes.

Additionally, the number of 35 micron droplets required to displace the same volume as one 500 micron droplet is approximately 2900, and the total surface area of the 35 micron droplets is approximately 14 times that of a single 500 micron droplet. Thus the coalescer serves to significantly minimize the surface area and time for methanol scavenging from the continuous phase by the dispersed phase. Such decreased scavenging results in increased methanol concentrations remaining in the continuous phase and hence increased conversion and yield.

As a result of the faster settling velocity, a degree of phase separation of the glycerin phase from the biodiesel phase is greater than the phase separation performed in a process without the coalescer unit using the same decanter. The degree of phase separation is the ratio of a separated glycerin phase drawn off the decanter to the glycerin phase in the fluid mixture exiting the reactor. Additionally, use of the coalescer reduces a decanter length required to achieve a selected phase separation of the glycerin phase from the biodiesel phase. Similarly, use of the coalescer reduces a residence time required in a decanter required to achieve a selected phase separation of the glycerin phase from the alkyl ester phase.

In some embodiments, a decanter may be used that has a length that is significantly longer than is required to separate out the glycerin phase. As indicated above, the glycerin phase can have an average droplet size that results in settling out in less than a minute. However, a longer decanter that provides a longer residence time allows the transesterification reaction to continue in the decanter, even after the glycerin phase has settled out from the biodiesel phase. As a result, overall conversion of reactants, and yield of biodiesel (alkyl ester) are increased. In some embodiments, the degree of conversion and yield in the product stream from the first reactor is at least 86% and 78% respectively; the degree of conversion and yield in the product stream drawn off from the first decanter is at least 90% and 88% respectively. In some embodiments, the degree of conversion and yield in the product stream from the second reactor is at least 99.1% and 98.4% respectively; the degree of conversion and yield in the product stream drawn off from the second decanter is at least 99.8% and 99.7% respectively.

Figure 2A:
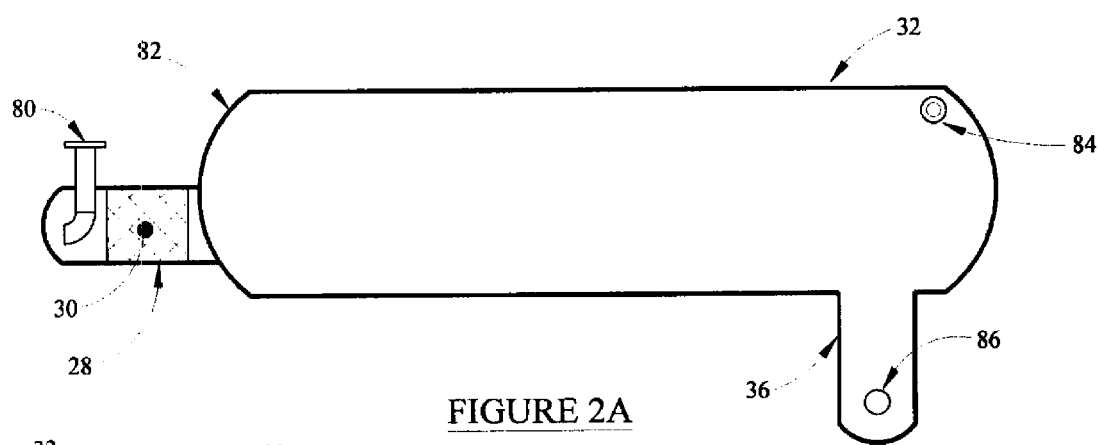
FIG. 2A depicts a view in section along the longitudinal axis of a coalescer and decanter.
Figure 2B:
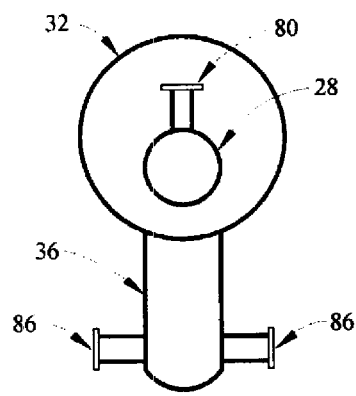
FIG. 2B depicts a view of a radial cross-section of a coalescer and decanter.
Figure 2C:
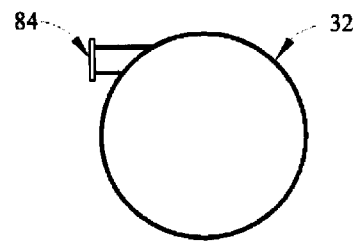
FIG. 2C depicts a view of a radial cross-section of the decanter near the reaction mixture exit.

FIGS. 2A-C show an embodiment of a combined coalescer decanter according to an embodiment of the present invention. FIG. 2A depicts a view in section along the longitudinal axis of the coalescer and decanter. FIG. 2B depicts a view of a radial cross-section of the coalescer and decanter. FIG. 2C depicts a view of a radial cross-section of the decanter near the reaction mixture exit. Shown is the coalescing unit 28 with coalescing element 30. The flow of reaction mixture, such as the reaction product of first tubular reactor 20, enters the coalescer unit 28 via J-pipe 80 which, among other things reduces the velocity head from the reaction mixture flow. The mixture, with its velocity reduced, enters and passes through coalescing element 30. The mixture exiting coalescing element 30 enters the decanter unit 32. In some embodiments, and as shown in FIGS. 2A and 2B, the coalescer unit 28 is positioned to introduce reaction mixture into the bottom portion of the decanter unit 32. In some embodiments, the coalescer unit 28 is positioned so that over 90 percent of the flow of the reaction mixture from the coalescer unit enters the decanter unit 32 below the midpoint of the height of the horizontal flow decanter 32. In some embodiments this lower positioning of the coalescer unit 28 significantly reduces the time for separation of the glycerin phase from the biodiesel phase in the decanter 32. This advantageously shifts the equilibrium in favor of further reaction and inhibits reverse equilibrium reactions. Glycerin is removed from sump 36 via exit pipes 86. Biodiesel, unreacted methanol, residual catalyst, and a very small amount of glycerin are extracted from decanter 32 via outlet pipe 84

Second coalescing unit 58 and second decanter 62 can be of similar or identical designs as first coalescing unit 28 and first decanter 32, respectively. In some embodiments, the volumes of the first and second coalescer units are the same. Alternatively, the volume of the second coalescing unit is larger than the first coalescing unit. In such embodiments, the diameters of the first and second coalescing units are the same and the length of the first coalescing unit is shorter than the length of the second coalescing unit.

The biodiesel product achieved by embodiments of the present invention may have concentrations of triglycerides, and diglycerides and monoglycerides which are lower than traditional biodiesel concentrations. Embodiments of the present invention may be adapted to particularly provide these concentrations.

A well known disadvantage of biodiesel fuels produced by past processes is gelling at lower temperature conditions, i.e., starting at a temperature range of about 32° F. A cause of such gelling is sufficiently high concentrations of unreacted mono-, di-, and triglycerides. One way to reduce or prevent such gelling is to process the biodiesel to remove or reduce the concentration of such components, which incurs additional processing cost. However, embodiments of the present invention have improved conversion and yield over known processes, which results in significantly lower concentrations of the unreacted components in the biodiesel. As a result, embodiments of the invention can produce biodiesel in which gelling caused by such components is substantially reduced or eliminated. Also, additional processing to remove such components is not necessary. In some embodiments, the concentrations of monoglycerides, diglycerides, and triglycerides in the biodiesel product stream from the second decanter are upon removal of excess alcohol, less than 0.1 wt %, less than 0.1 wt % and less than 0.2 wt % respectively, with a total glycerol content of less than 0.05 wt %.

In one embodiment of the present invention the biodiesel production facility will produce 15,000,000 gallons of biodiesel per year based on 8000 hours per year of operating time. The facility will produce B100 biodiesel meeting or exceeding the European biodiesel standard EN 14214.

While particular embodiments of the invention and variations thereof have been described in detail, other modifications and methods will be apparent to those of skill in the art. Accordingly, it should be understood that various applications, modifications, and substitutions may be made of equivalents without departing from the spirit of the invention or the scope of the claims. Various terms have been used in the description to convey an understanding of the invention; it will be understood that the meaning of these various terms extends to common linguistic or grammatical variations or forms thereof. Further, it should be understood that the invention is not limited to the embodiments that have been set forth for purposes of exemplification, but is to be defined only by a fair reading of claims that will be appended, including the full range of equivalency to which each element thereof is entitled.

The invention claimed is:

1. A process for production of biodiesel from a transesterification reaction of alcohol and triglycerides in a multi-zone tubular reactor, the process comprising: allowing a fluid reaction mixture to flow through a multi-zone tubular reactor having three zones along its axis, wherein alkyl esters and glycerin are formed from alcohol and triglycerides in the reaction mixture as the reaction mixture flows through the zones, wherein the zones comprise an entrance zone, an exit zone, and an intermediate zone between the entrance and exit zones, wherein flow of the reaction mixture in the intermediate zone is turbulent and the flow changes to transitional or laminar in the exit zone.

2. The process of claim 1, wherein a diameter of the tubular reactor in the exit zone is greater than in the intermediate zone, the higher diameter facilitating the transition from the turbulent flow to the laminar or transitional flow.

3. The process of claim 1, wherein the flow in the entrance zone is turbulent.

4. The process of claim 1, wherein the flow in the entrance zone is laminar or transitional, wherein a diameter of the tubular reactor in the entrance zone is adjusted to provide the laminar or transitional flow.

5. The process of claim 1, wherein a viscosity of the reaction mixture increases between the entrance zone and the intermediate zone and increases between the intermediate zone and the exit zone.

6. The process of claim 1, wherein the reaction mixture in the entrance zone comprises a dispersed phase in a continuous phase, a majority of the continuous phase being triglyceride and a majority of the dispersed phase being alcohol.

7. The process of claim 1, wherein the reaction mixture in the intermediate zone comprises two dispersed phases in a continuous phase, a majority of one dispersed phase comprising alcohol, a majority of the other dispersed phase comprising glycerin, and a majority of the continuous phase comprising triglycerides and alkyl ester.

8. The process of claim 1, wherein the reaction mixture in the exit zone comprises a dispersed phase in a continuous phase, a majority of the dispersed phase comprising glycerin and a majority of the continuous phase comprising alkyl ester.

9. The process of claim 1, wherein a Reynolds number in the exit zone is less than 4000.

10. A process for production of biodiesel from a transesterification reaction of alcohol and triglycerides in a multi-zone tubular reactor, the process comprising: allowing a fluid reaction mixture to flow through a multi-zone tubular reactor having at least three zones along its axis, wherein alkyl esters and glycerin are formed from alcohol and triglycerides in the reaction mixture as the reaction mixture flows through the zones, the zones comprising an entrance zone, an exit zone, and an intermediate zone between the entrance and exit zone, wherein the flow in the entrance zone is laminar or transitional and changes to turbulent in the intermediate zone.

11. The process of claim 10, wherein a diameter of the tubular reactor in the intermediate zone is less than a diameter of the tubular reactor in the entrance zone so as to provide turbulent flow in the intermediate zone.

12. The process of claim 10, wherein a viscosity of the reaction mixture increases between the entrance zone and the intermediate zone and increases between the intermediate zone and the exit zone.

13. The process of claim 10, wherein the reaction mixture in the entrance zone comprises a dispersed phase in a continuous phase, a majority of the continuous phase being triglyceride and a majority of the dispersed phase being alcohol.

14. The process of claim 10, wherein the reaction mixture in the intermediate zone comprises two dispersed phases in a continuous phase, a majority of one dispersed phase comprising alcohol, a majority of the other dispersed phase comprising glycerin, and the a majority of the continuous phase comprising triglycerides and alkyl ester.

15. The process of claim 10, wherein the reaction mixture in the exit zone comprises a dispersed phase in a continuous phase, a majority of the dispersed phase comprising glycerin and a majority of the continuous phase comprising alkyl ester.

16. A process for production of biodiesel from a transesterification reaction of alcohol and triglycerides in a multi-zone tubular reactor, the process comprising: allowing a fluid reaction mixture to flow through a multi-zone tubular reactor having at least three zones along its axis, wherein alkyl esters and glycerin products are formed from alcohol and triglycerides reactants in the reaction mixture as the reaction mixture flows through the zones, wherein the zones comprise an entrance zone, an exit zone, and an intermediate zone between the entrance and exit zones, wherein a reaction mixture viscosity increases as the reaction mixture flows between the entrance zone to the intermediate zone and increases as it flows from the intermediate zone to the exit zone, wherein at least one static mixer is positioned in the entrance zone and/or the intermediate zone that modifies a flow of the reaction mixture, increasing the homogeneity of the reaction mixture and increasing conversion and/or yield of a transesterification reaction; wherein there is no static mixer in the exit zone so the flow in the exit zone is transitional or laminar.

17. The process of claim 16, wherein the reaction mixture along a majority of the entrance zone comprises a two phase mixture including the reactants, the reaction mixture along a majority of the intermediate zone comprises a three phase mixture including the products and the reactants, and the reaction mixture along a majority of the exit zone comprises a two phase mixture including the products.

18. The process of claim 16, wherein a static mixer is positioned in the entrance zone.

19. The process of claim 18, wherein a length of the static mixer is 4% to 95% of the entrance zone.

20. The process of claim 17, wherein at least two static mixers are positioned in the intermediate zone.

21. The process of claim 20, wherein a distance between the mixers is between 0.5-2 times a length that the flow modification deteriorates to zero.

22. A process for production of biodiesel from an alcohol and triglycerides from a transesterification reaction in a multi-zone tubular reactor, the process comprising: allowing a fluid reaction mixture to flow through a multi-zone tubular reactor having at least three zones along its axis, wherein the zones comprise an entrance zone, an exit zone, and an intermediate zone between the entrance and exit zones, wherein the entrance zone and the intermediate zone each include at least one static mixer that modifies a flow of the reaction mixture to increase the homogeneity of the reaction mixture and increase conversion and yield of a transesterification reaction, wherein the static mixers in the entrance and intermediate zones are different to account for differences in physical properties of the reaction mixture in the zones.

23. The process of claim 22, wherein the differences in physical properties comprise a lower viscosity in the entrance zone than the intermediate zone.

24. The process of claim 22, wherein the characteristics of the mixers comprise a number of mixers in each zone, mixer type, mixer length, and spacing of mixers.

25. The process of claim 22, wherein the static mixers each comprise a plurality of pitched blades that modify the flow.

26. The process of claim 25, wherein a length of a static mixer in the entrance section is longer than a static mixer in the intermediate zone to account for a lower miscibility of a dispersed phase in a continuous phase in the entrance zone.

27. A process for production of biodiesel from an alcohol and triglycerides from a transesterification reaction in a multi-zone tubular reactor, the process comprising: allowing a fluid reaction mixture comprising a dispersed fluid phase to flow through a multi-zone tubular reactor having at least three zones along its axis, the zones comprising an entrance zone, an exit zone, and an intermediate zone between the entrance and exit zones, wherein the reaction mixture along a majority of the entrance zone comprises a majority of reactants and the reaction mixture along a majority of the intermediate zone comprises products and reactants, mixing the reaction mixture in the entrance zone and the intermediate zone to increase homogeneity of the reaction mixture in the zones, wherein the degree of mixing in the entrance zone and the exit zones is different to account for a difference in physical properties in the zones.

28. The process of claim 27, wherein a viscosity of the reaction mixture increases between the entrance zone and the intermediate zone due to a change in chemical composition arising from a transesterification reaction.

29. The process of claim 27, wherein the dispersed phase along a majority of the entrance zone comprises alcohol and a continuous phase comprising triglyceride.

30. The process of claim 27, wherein the dispersed phase along a majority of the intermediate zone comprises a dispersed phase including alcohol and a dispersed phase including glycerin and a continuous phase including triglycerides and alkyl ester.

31. The process of claim 27, wherein the mixing is performed as the reaction mixture flows though at least one static mixer in each of the entrance and intermediate zones, the characteristics of the mixers in the zones are different to account for a difference in properties of the reaction mixture in the zones.

32. The process of claim 31, wherein a length of a static mixer in the entrance zone is longer than a static mixer in the intermediate zone due to lower miscibility of the dispersed phase in the continuous phase in the entrance zone.

\* \* \* \* \*